(12) United States Patent
Volkmuth et al.

(10) Patent No.: US 10,873,228 B2
(45) Date of Patent: Dec. 22, 2020

(54) ROTOR OF AN ELECTRIC MACHINE

(71) Applicant: SIEMENS AKTIENGESELLSCHAFT, Munich (DE)

(72) Inventors: Benjamin Volkmuth, Sulzthal (DE); Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 272 days.

(21) Appl. No.: 15/751,348

(22) PCT Filed: Jun. 17, 2016

(86) PCT No.: PCT/EP2016/064033
§ 371 (c)(1),
(2) Date: Feb. 8, 2018

(87) PCT Pub. No.: WO2017/025233
PCT Pub. Date: Feb. 16, 2017

(65) Prior Publication Data
US 2018/0233977 A1 Aug. 16, 2018

(30) Foreign Application Priority Data
Aug. 12, 2015 (EP) .................... 15180674

(51) Int. Cl.
*H02K 1/32* (2006.01)
*H02K 1/02* (2006.01)
(Continued)

(52) U.S. Cl.
CPC ............... *H02K 1/325* (2013.01); *H02K 1/02* (2013.01); *H02K 1/16* (2013.01); *H02K 1/17* (2013.01);
(Continued)

(58) Field of Classification Search
CPC .......... H02K 1/246; H02K 1/325; H02K 9/02
See application file for complete search history.

(56) References Cited

U.S. PATENT DOCUMENTS 4,883,982 A * 11/1989 Forbes .................... F04D 25/08
310/62
6,724,115 B2 * 4/2004 Kusase .................... H02K 1/27
310/113

(Continued)

FOREIGN PATENT DOCUMENTS

CN 1523735 8/2004
DE 12 70 673 6/1968
(Continued)

OTHER PUBLICATIONS

PCT International Search Report and Written Opinion of International Searching Authority dated Aug. 7, 2017 corresponding to PCT International Application No. PCT/EP2016/064033 filed Jun. 17, 2016.

(Continued)

*Primary Examiner* — Dang D Le
(74) *Attorney, Agent, or Firm* — Cozen O'Connor

(57) ABSTRACT

A bell-shaped rotor of an electric machine includes a cylindrical segment and a conical segment, wherein the cylindrical segment has magnetically active regions and nonmagnetic regions, where the rotor is produced at least partially via an additive production method, where the electric machine includes, in particular, an outer stator, an inner stator, which is arranged concentric to the outer stator within the outer stator, and the rotor, which is arranged concentric to the outer stator and the inner stator between the outer stator and the inner stator.

20 Claims, 5 Drawing Sheets

(51) Int. Cl.
*H02K 1/20* (2006.01)
*H02K 1/24* (2006.01)
*H02K 15/02* (2006.01)
*H02K 16/04* (2006.01)
*H02K 21/40* (2006.01)
*H02K 9/06* (2006.01)
*H02K 9/19* (2006.01)
*H02K 1/16* (2006.01)
*H02K 1/17* (2006.01)
*H02K 9/02* (2006.01)

(52) U.S. Cl.
CPC .............. *H02K 1/20* (2013.01); *H02K 1/246* (2013.01); *H02K 1/32* (2013.01); *H02K 9/02* (2013.01); *H02K 9/06* (2013.01); *H02K 9/19* (2013.01); *H02K 15/022* (2013.01); *H02K 16/04* (2013.01); *H02K 21/40* (2013.01)

(56) References Cited

U.S. PATENT DOCUMENTS

| | | | |
|---|---|---|---|
| 7,151,334 B2 * | 12/2006 | Asaka | H01F 41/0266 310/156.12 |
| 2004/0163423 A1 | 8/2004 | Kim et al. | |
| 2009/0230800 A1 * | 9/2009 | Jafoui | H02K 7/006 310/156.12 |
| 2013/0062975 A1 | 3/2013 | Pabst et al. | |
| 2013/0278094 A1 | 10/2013 | Peterson et al. | |
| 2014/0035423 A1 | 2/2014 | Veronesi et al. | |
| 2015/0076951 A1 | 3/2015 | Lynch et al. | |
| 2016/0204663 A1 | 7/2016 | Huang et al. | |

FOREIGN PATENT DOCUMENTS

| | | |
|---|---|---|
| DE | 10 2011 012 454 | 8/2012 |
| EP | 1 940 005 | 7/2008 |
| EP | 2 498 376 | 9/2012 |
| EP | 2 693 612 | 2/2014 |
| EP | 2 770 616 | 8/2014 |
| GB | 521 617 | 5/1940 |
| JP | S 59-175350 | 10/1984 |
| WO | WO 2015/034514 | 3/2015 |

OTHER PUBLICATIONS

European Search Report issued in the corresponding European Application No. 15180674.2.

Office Action dated Mar. 25, 2019 issued in Chinese Patent Application No. 201680047345.X.

Office Action (and an English translation) dated Nov. 19, 2019 issued in Chinese Patent Application No. 201680047345.X.

* cited by examiner

ROTOR OF AN ELECTRIC MACHINE

CROSS REFERENCE TO RELATED APPLICATIONS

This is a U.S. national stage of application No. PCT/EP2016/064033 filed on Jun. 17, 2016. Priority is claimed on European Application No. EP 15180674.2 filed Aug. 12, 2015, the content of which is incorporated herein by reference in its entirety.

BACKGROUND OF THE INVENTION

1. Field of the Invention

The invention relates to a rotor of an electric machine, the electric machine and to a method for manufacturing the rotor.

The electric machine is a synchronous machine or an asynchronous machine, for instance. The synchronous machine is formed as a three-phase synchronous machine, for instance, in particular as a permanently-excited three-phase synchronous machine. Three-phase synchronous machines of this type can be operated as a motor or also as a generator, for instance.

SUMMARY OF THE INVENTION

It is an object of the invention to provide a bell-shaped rotor that provides for high efficiency of an electric machine with this rotor while keeping its manufacture as simple as possible.

This and other objects and advantages are achieved in accordance with the invention by a rotor, an electric machine, and a method for manufacturing the rotor A rotor of an electric machine can be formed such that it has a bell shape. Rotors of this type can also be referred to as bell-shaped rotors. The rotor has a cylindrical section and a conical section, where the cylindrical section has magnetically active areas and non-magnetic areas. The rotor can be optimized with respect to its effectiveness in the electric machine by subdivision into non-magnetic areas and magnetically active areas.

Magnetically active areas are, e.g., permanent magnets but also areas with soft-magnetic materials such as ferromagnetic materials that can be easily magnetized in a magnetic field.

The rotor can be used as a bell-shaped rotor in a double stator machine, for instance. An additive manufacturing method can be used to manufacture the rotor, particularly when the rotor has complex structures. A manufacturing method can be used to build a bell-shaped rotor, in which a three-dimensional body is manufactured from small individual particles with the aid of additive manufacturing (AM) technology. In such cases, at least 2 different materials can be used. Here, a first material is ferromagnetic and a second material is non-magnetic, where the non-magnetic material has a value of μr<2, for instance.

With an additive manufacturing method (AM technology), it is possible to manufacture the rotor, which is expensive using conventional manufacturing means (e.g. milling and turning), more easily.

In one embodiment of the rotor, the rotor has radial holes. As a result, the weight of the rotor and also its inertia can be reduced, for instance. The holes can also be used for air cooling. In particular, the holes can be formed as air vanes that contribute to ventilating the rotor or the electric machine. An efficient air cooling of the electric machine serves to increase the efficiency.

In an embodiment of the rotor, the rotor has air vanes. The air vanes are formed in particular via a non-magnetic area of the rotor, so that the air vanes are integrated into the non-magnetic areas of the rotor. The air vanes generate an air flow inside the electric machine and thus contribute to a reduced heating effect. This results in lower stresses on the components (HRE-reduced or free magnets, or high remanent magnets) and/or increases the output of the electric machine. The air vanes can be integrated into non-magnetic webs of the rotor or into a rotor area in front of or behind the active part. The active part of the rotor is the part that has the magnetically active parts.

In another embodiment of the rotor, the rotor has a conical section. The cylindrical section can be connected to form a shaft via the conical shape. In order to reduce the weight of the conical section and/or to increase its stability, it has a web structure. The conical shape can be pierced between the webs, in other words can have holes.

In a further embodiment of the rotor, the magnetically active area of the rotor has a lamination. The lamination is disposed in particular in the magnetically active part. The lamination is achieved, for instance, by alternately solidifying a liquid or powder input material using an AM process. The "lamination" enables iron losses in the rotor to be reduced.

Structures for reducing eddy currents can also be integrated into the rotor structure in addition to the intended magnetic structure.

In an embodiment of the rotor, the rotor has an additively manufactured three-dimensional element. This element is, e.g., at least one part of the cylindrical section and/or one part of the conical section of the rotor. A reduced inertia of the rotor can be achieved by building the rotor using an additive manufacturing method. A topology of the rotor can be optimized such that the rotor, where mechanical forces occur, selectively has webs and/or reinforcements. The AM technology allows a component to be built such that material is built up in particular only at the loaded areas. It is therefore possible to realize root-like areas in the area of a shaft end. These root-like areas form web structures, which may provide for a good force transmission particularly in the area of the conical section. The non-magnetic areas in the active part can be configured hollow or can also be provided with a latticed structure to increase stability. Furthermore, it is also possible to provide axial holes in the areas in which no material is required.

A permanently-excited three-phase synchronous machine can be developed such that it has a bell-shaped rotor as described above. Permanent magnets have a limited temperature range in use. Magnets with rare earths can often also be used at higher temperatures, but are comparatively expensive. An electric machine in which the permanent magnets used cannot be impermissibly heated can therefore be a design objective.

An electric machine can be developed such that it has an external stator, an internal stator, which is arranged concentric to the external stator within the external stator, and a rotor, which is arranged concentric to the external stator and the internal stator between the external stator and the internal stator and which can be moved relative to the external stator and the internal stator. In such cases, the external stator has a plurality of windings. The internal stator has a plurality of permanent magnets. The rotor has in particular one carrier element, which is formed entirely or partially from a non-magnetic material and which has a plurality of cutouts, in which a soft-magnetic segment is arranged in each case.

The electric machine is particularly formed as a three-phase synchronous machine and can be used as a motor or as a generator. The electric machine comprises an external stator, which has a number of windings. For this purpose, the external stator can have corresponding grooves in which the windings are arranged. The rotor, which can be connected to a shaft in a torque-proof manner, for instance, is arranged within the external stator. The rotor comprises in turn a carrier element that is formed from a non-magnetic material. A non-magnetic material can usually not be influenced by a magnetic field. A plurality of soft-magnetic segments can be embedded in the carrier element. Finally, the electric machine comprises an internal stator having a plurality of permanent magnets. A permanently-excited three-phase synchronous machine can therefore be provided, in which the permanent magnets are arranged on the internal stator and are thus not moved during operation of the electric machine. Heat produced during operation of the electric machine can thus be discharged more easily from the permanent magnet than with electric machines in which the permanent magnets are provided in the rotor.

In a preferred embodiment, the electric machine has a first cooling device for cooling the internal stator. Here, the heat produced during operation of the electric machine can be reliably discharged from the permanent magnets of the internal stator. This prevents the permanent magnets from being demagnetized. Magnets with a lower coercive field strength can thus be used. This means in turn that permanent magnets with a lower proportion of rare earths can be used. This increases the remanence and reduces costs.

The electric machine preferably has a second cooling device for cooling the external stator. The second cooling device makes it possible to prevent the windings of the external stator from being overheated during operation of the electric machine and thus becoming possibly damaged. Reliable operation of the electric machine can be enabled in this way.

Furthermore, it is advantageous if the first cooling device and/or the second cooling device has/have a plurality of cooling tubes, through which a cooling fluid passes. Water or a water-glycol mixture can be used as cooling fluid, for instance. Corresponding cooling tubes can be manufactured easily and cost-effectively. In one embodiment, the cooling tubes are arranged in an iron core of the internal stator and/or the external stator. For instance, the cooling tubes of the first cooling device and/or of the second cooling device can be provided by corresponding boreholes, which are introduced into the respective iron core. Cooling tubes of this type can be manufactured easily and cost-effectively.

Furthermore, it has proven to be advantageous for the cooling tubes to be arranged and uniformly distributed in the peripheral direction along the axial direction of the electric machine. Such an arrangement of the cooling tubes allows the heat produced during operation of the electric machine both in the internal stator and also in the external stator to be uniformly discharged.

In one embodiment, the permanent magnets of the internal stator are formed from a ferrite. The use of a ferrite is advantageous in that cost-effective permanent magnets can therefore be provided for the internal stator.

In an alternative embodiment, the permanent magnets of the internal stator contain neodymium iron boron. Such permanent magnets of the internal stator that have iron, neodymium and/or boron are characterized by a high temperature resistance.

In a further embodiment, the rotor is formed in the shape of a pan. One such embodiment of the rotor has the advantage that a rotor can thus be provided with, a low mass inertia. In this way an electric machine or a motor with a high dynamic can be provided.

In a further embodiment, the rotor is connected to a shaft which is hollow. Particularly in the case where the electric machine is used for a machine tool, a flexible embodiment of the machine tool can be enabled by the use of a hollow shaft.

In one method for manufacturing a rotor of an electric machine, an additive manufacturing method is used. The rotor has a bell shape, where an additive manufacturing method is used at least partially to manufacture the rotor. Complex geometric structures can be easily produced via the additive manufacturing method.

Examples of additive manufacturing methods are powder-bed methods, extrusion methods and liquid material methods. Powder-bed methods include selective laser melting (SLM), selective laser sintering (SLS), selective head sintering (SHS), binder jetting (3D printing from powder material with binder), or electron beam melting (EMB). Extrusion methods can include the following methods: fused deposition modeling (FDM or also fused filament fabrication (FFF)), laminated object modeling (LOM), application welding or cladding, wax deposition modeling (WDM), contour crafting, cold gas spraying and electron beam welding (EBW). Examples of liquid material methods are stereolithography (SLA)+micro-SLA, digital light processing (DLP) and liquid composite molding (LCM).

In one embodiment of the method for producing the rotor, a rotor of the type described is produced. Here, the cylindrical section and/or the conical section are produced entirely or partially via AM technology.

In one embodiment of the method, a lamination, which serves in particular to reduced eddy currents, is generated by an alternating solidification of different materials. The lamination reduces the iron losses in the rotor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described in more detail below by way of example with reference to the appended drawings, in which.

DETAILED DESCRIPTION OF THE EXEMPLARY EMBODIMENTS

Figure 1:
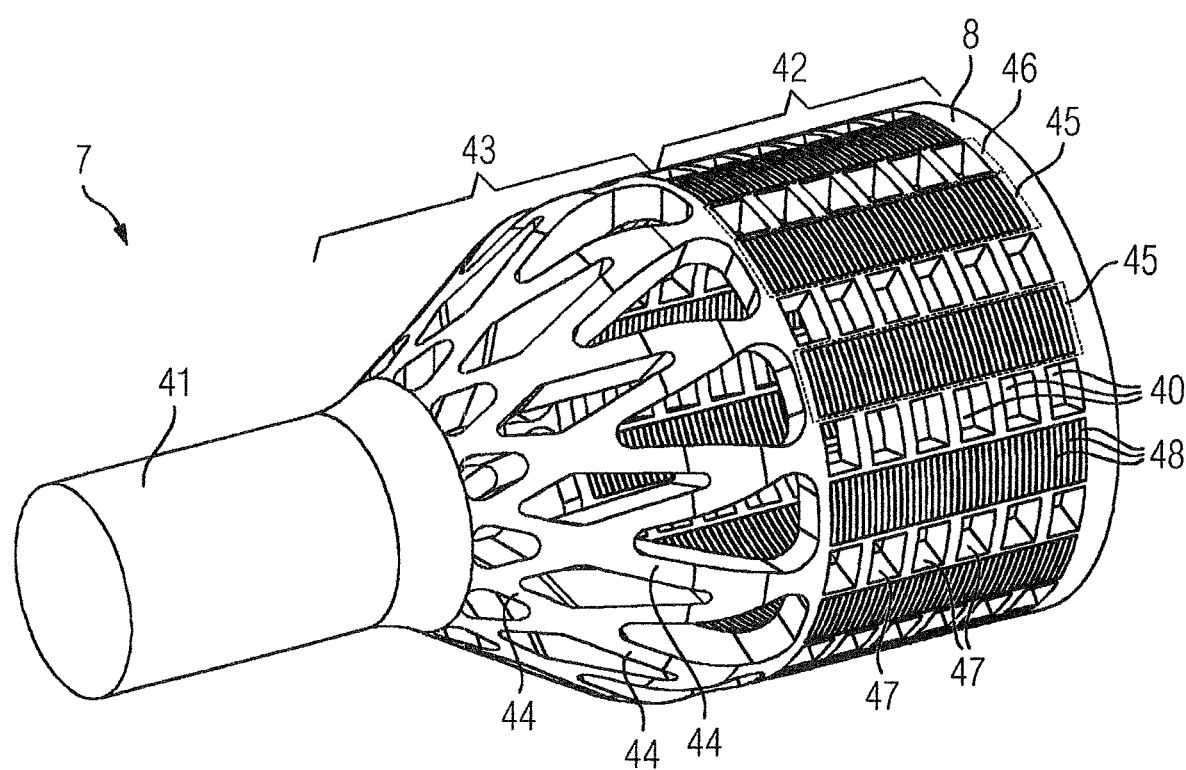
FIG. 1 shows a rotor in accordance with the invention.

FIG. 1 shows a rotor 7 of an electric machine. The rotor is formed as a bell-shaped rotor in particular for a double stator machine. The rotor can be produced using additive manufacturing methods. The rotor 7 has a cylindrical section 42 and a conical section 43. The conical section, which has a root-like structure with respect to the active part (the cylindrical section 42) or web structure 44, adjoins a shaft and the cylindrical section 42, where the cylindrical section 42 has magnetically active areas 42 and non-magnetic areas 46.

Alternatively, it is also possible to realize the areas designed here to be hollow (between the magnetic areas of the active part and the transition from shaft end to active part) in a solid or latticed construction; this is not shown in the figure, however.

The rotor 7 has axial holes 40 between magnetically active areas 45. The magnetically active area 45 is realized with laminations 48.

The holes 40 are aligned axially, wherein the individual holes are each formed by radial holes 40.

If the holes have at least partially one "cant" in one of the hole walls, which have a normal in the direction of rotation, then an air vane 47 can form that serves to cool the electric machine.

Figure 2:
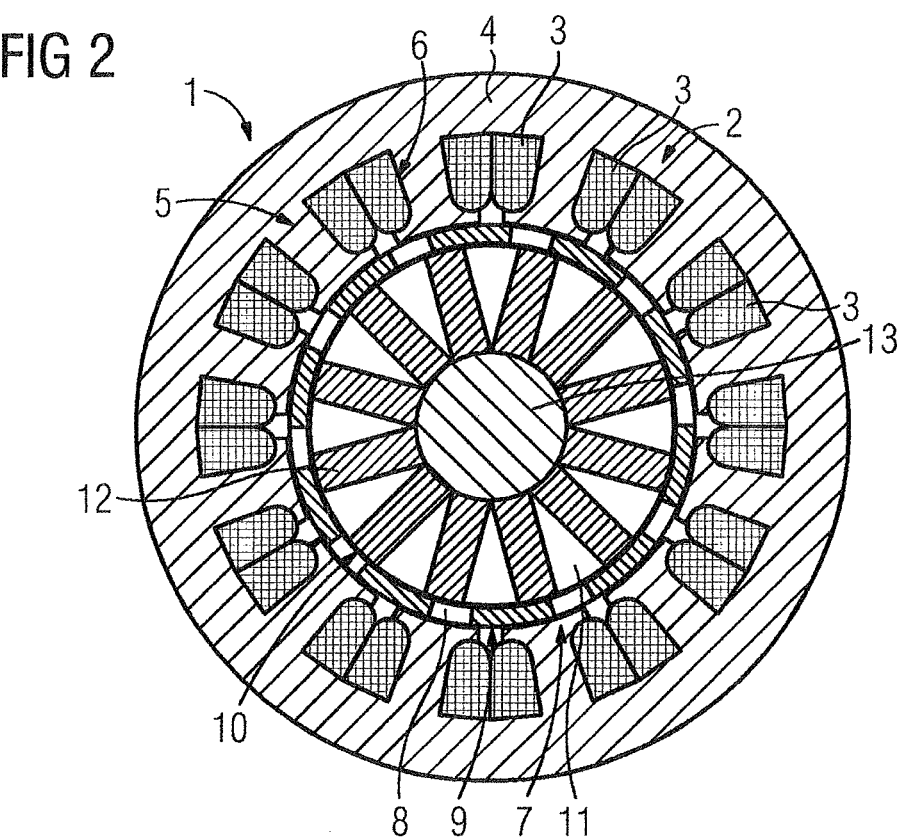
FIG. 2 shows a cross-section through an inventive electric machine in accordance with a first embodiment.

FIG. 2 shows a cross-sectional illustration of a first embodiment of an electric machine 1. The electric machine 1 comprises an external stator 2. The external stator 2 has an iron core 4, which has a plurality of teeth 5 with grooves 6 disposed therebetween. Corresponding windings 3 are introduced into the grooves 6. The windings 3 are typically electrically connected to a three-phase power supply (not shown here). A rotor 7 is arranged within the external stator 2. The rotor 7 is arranged here concentric to the external stator 2. The rotor 7 has a carrier element 8, which is formed from a non-magnetic material. The carrier element 8 has a number of cutouts into which soft-magnetic segments 9 are embedded in each case. Furthermore, the electric machine 1 has an internal stator 10. The internal stator 10 is arranged concentrically within the rotor 7. The internal stator 10 comprises an iron core 11, which has a plurality of cutouts into which a permanent magnet 12 is arranged in each case. The permanent magnets 12 can contain neodymium iron boron for instance.

In the present exemplary embodiment, the external stator 2 or its windings 3 has the number of pole pairs pw=4. The internal stator 10 or its permanent magnets 12 have the number of pole pairs pm=6. Here the rotor 7 has ten soft-magnetic segments 9. The number of pole pairs of the rotor is therefore pr=10. In such cases, the number of externally effective pole pairs corresponds to the number of pole pairs of the rotor. In general, the number of pole pairs of the electric machine 1 can be combined in accordance with the following relationship:

$$pr=|pm+/-pw| \qquad \text{Eq.1}$$

Figure 3:
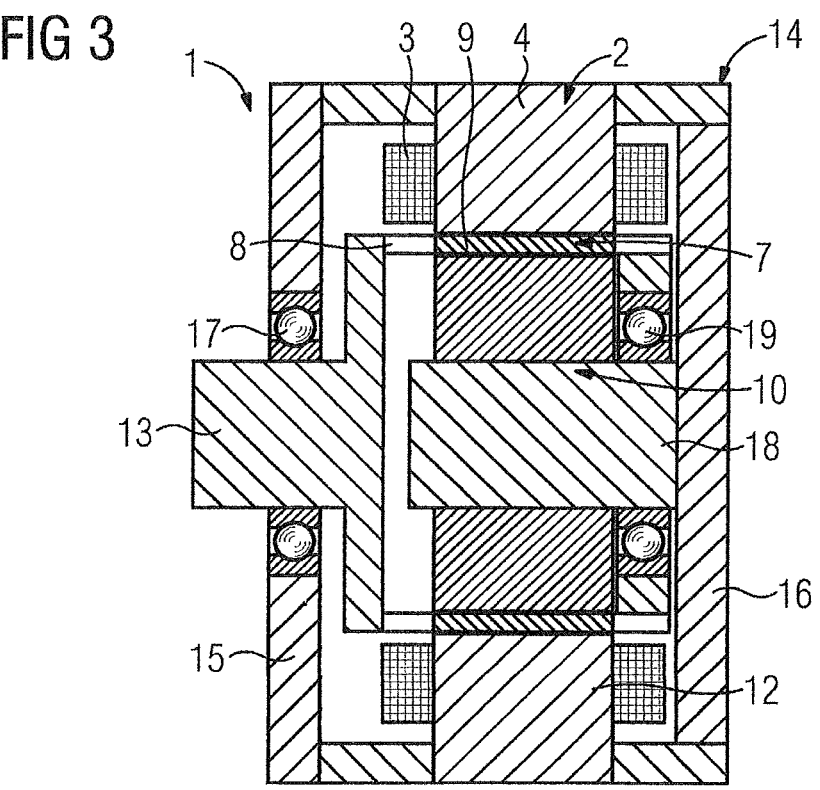
FIG. 3 shows a longitudinal section of the electric machine of FIG. 1.

FIG. 3 shows a longitudinal section of the electric machine 1 of FIG. 2. This shows that the rotor 7 formed in the shape of a pan. The pan-shaped rotor 7 is connected to a shaft 13 in a torque-proof manner. Furthermore, a housing 14 of the electric machine is visible in FIG. 3. The housing 14 has a first flange 15 on the drive side. The housing 14 has a second flange 16 on the non-drive side. A first bearing 17, which is formed as a ball bearing, for instance, is arranged between the first flange 15 and the shaft 13. Furthermore, the electric machine 1 has a supporting element 18 upon which the internal stator 10 is held. A second bearing element 19, which can likewise be formed as a ball bearing, is arranged between the supporting element 18 and the rotor 7.

Figure 4:
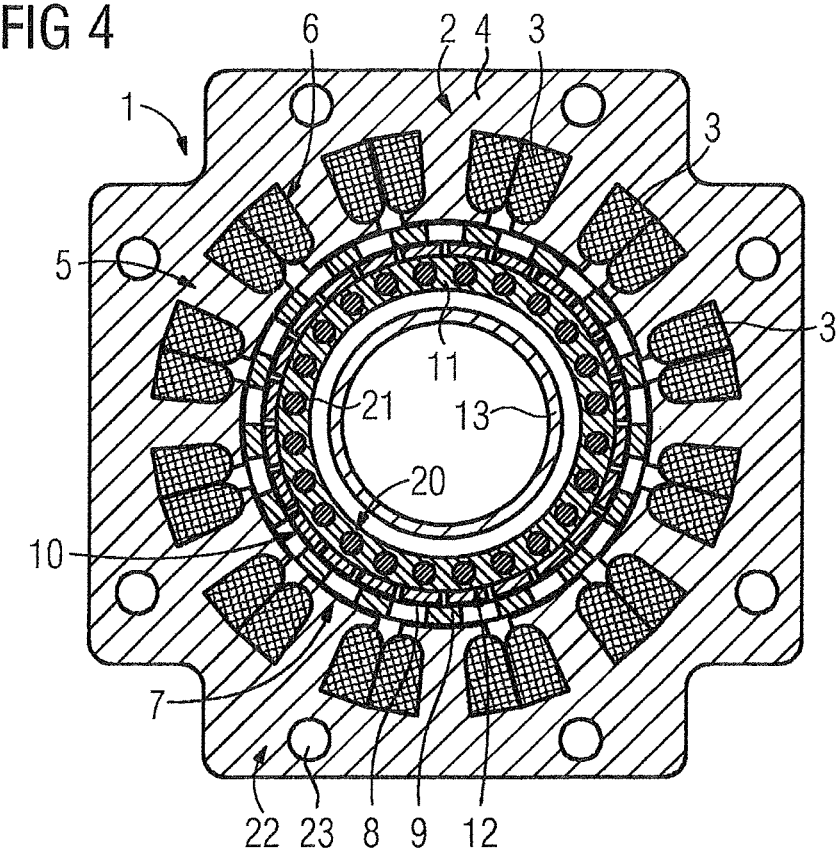
FIG. 4 shows cross-section of an inventive electric machine in accordance with a further embodiment.

FIG. 4 shows in cross-section a further embodiment of an electric machine 1. The electric machine 1 shown in FIG. 4 differs from that shown in FIG. 2 in that the electric machine has a first cooling device 20 for cooling the internal stator 10. The first cooling device 20 comprises a plurality of cooling tubes 21, which are arranged within the iron core of the internal stator 12. The cooling tubes 21 are arranged distributed uniformly along the peripheral direction of the internal stator 12. The cooling tubes 12 extend along the axial direction of the electric machine 1. The permanent magnets 12 can be cooled with the first cooling device 20. With the electric machine 1 of FIG. 4, the permanent magnets 12 can be manufactured from ferrite, for instance.

Furthermore, the electric machine 1 comprises a second cooling device 22. The second cooling device 22 also comprises a plurality of cooling tubes 23, which extend along the axial direction of the electric machine. The cooling tubes 23 of the second cooling device 22 are also arranged uniformly distributed along the peripheral direction of the external stator 2. A cooling medium, in particular a cooling fluid, can pass through the cooling tubes 21, 23. The windings 3 of the external stator 2 can be cooled using the second cooling device. Heat produced during operation of the electric machine 1 can be discharged from the internal stator 10 by means of the first cooling device 20. This prevents the permanent magnets 9 from heating up and thus being demagnetized.

In the exemplary embodiment in FIG. 4, the winding system in the external stator 2 has the number of pole pairs pw=5. The number of pole pairs pm=12 for the internal stator 10 is calculated from the number of permanent magnets 12 in the internal stator 10. Using Eq.1, the number of externally effective pole pairs of the rotor 7 is pr=17.

Figure 5:
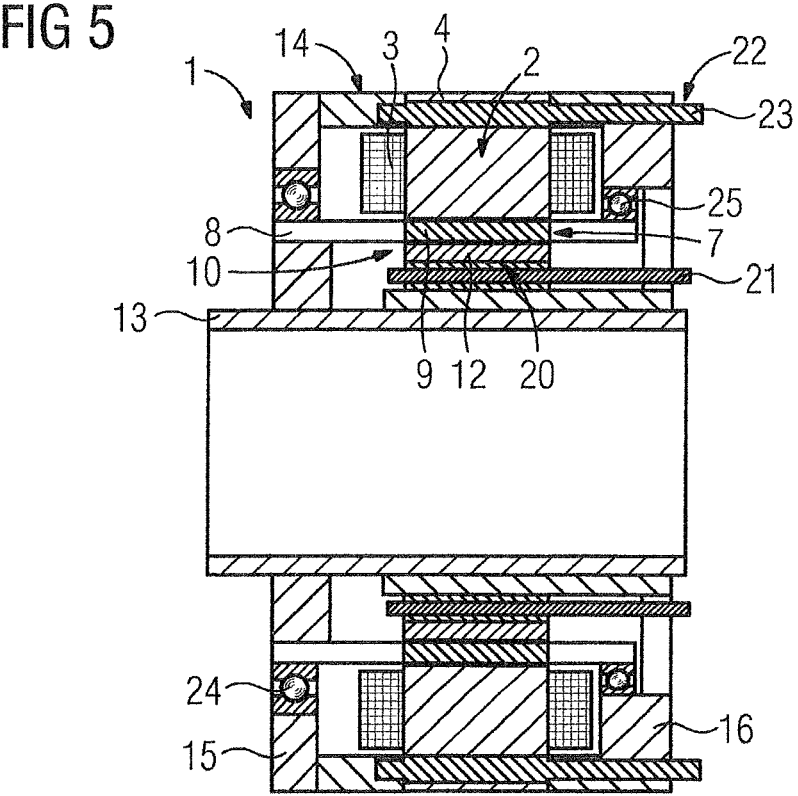
FIG. 5 shows a longitudinal section of the electric machine of FIG. 3.

FIG. 5 shows a cross-section of the electric machine 1 of FIG. 4. This shows that the shaft 13 of the electric machine 1 is formed as a hollow shaft in the present exemplary embodiment. Furthermore, the electric machine 1 here has a first bearing element 24 and a second bearing element 25. The first bearing element 24 is arranged between the first flange 15 and the rotor 7. The second bearing element 25 is arranged between the second flange 16 and the rotor 7. The bearing elements 24, 25 can be formed in particular as ball bearings.

Figure 6:
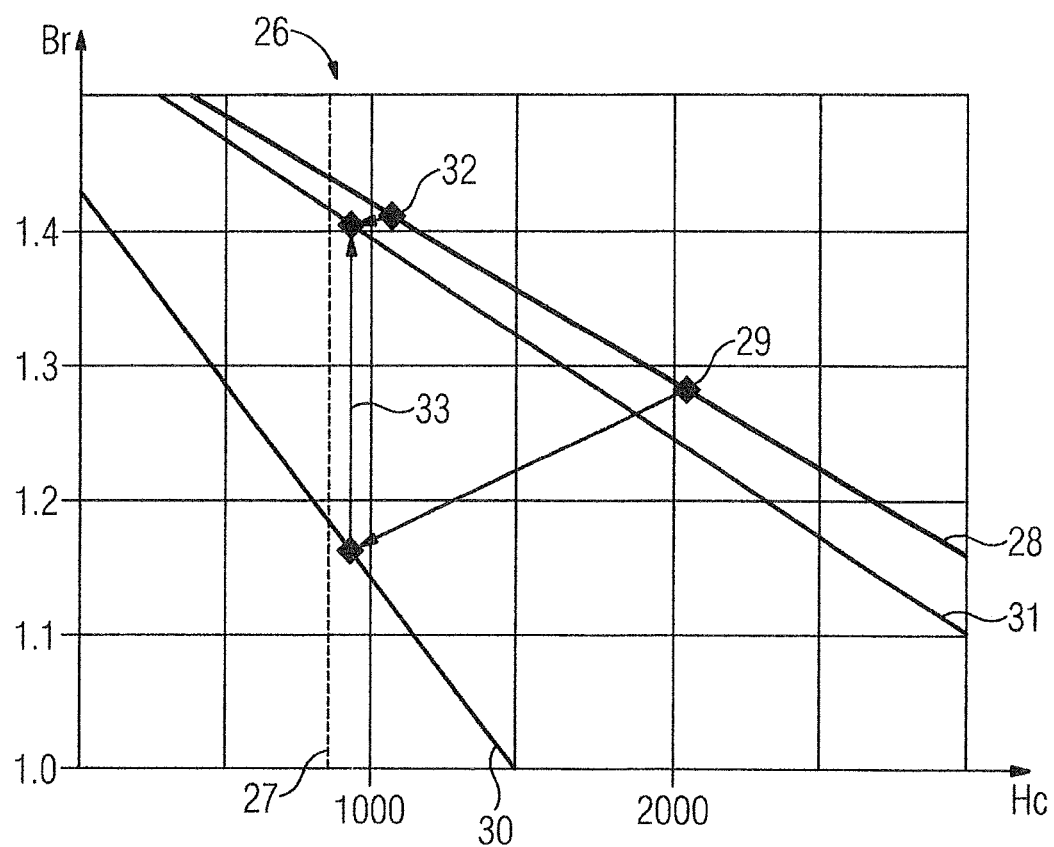
FIG. 6 shows a graphical plot in which the change in magnetic quality of the permanent magnets in an internal stator of the electric machine is shown as a function of the temperature.

FIG. 6 shows a graphical plot 26, in which the coercive field strength Hc is shown on the x-coordinate and the remanence Br is shown on the y-coordinate. By way of example, values for the coercive field strength Hc are shown here on the x-coordinate in kA/m. Furthermore, the remanence Br is shown on the y-coordinate by way of example. Furthermore, the dashed line 27 characterizes the minimum value for the coercive field strength Hc. The graphical plot 26 is intended to show the association between remanence Br, coercive field strength Hc and temperature. Here, the straight line 28 represents the association between coercive field strength Hc and remanence Br for a permanent magnet 12, which is formed from neodymium iron boron.

Such magnetic qualities with a high remanence have a higher proportion of heavy rare earths. In such cases, the point 29 represents a first material with a high coercive field strength Hc and a low remanence Br. If the temperature within the electric machine 1 is increased to a value of 130° C., for instance, the coercive field strength Hc and the remanence Br of the first material changes as a result of the temperature coefficients of the first material. The association, which is described by the straight line 30, applies to the association between coercive field strength Hc and remanence Br.

If the permanent magnets 12 are now cooled via the first cooling device 20 with a cooling fluid, in particular water, and are therefore heated merely to a temperature of at most 40° C., for instance, materials with a lower coercive field strength Hc can be used. This is indicated by the straight line 31. If, in this case, a second material, which is indicated here by the point 32, is used, which has a high remanence Br and a low coercive field strength Hc, then this is advantageous on the one hand in that the remanence Br is clearly raised, for instance, by a value of 20%. Here, this is indicated by the arrow 33. A further advantage is produced in that less expensive rare earths have to be used for the permanent magnets 12. The selection of the first and the second material results from the requirement that the minimum value for the coercive field strength Hc, which is characterized by the line 27, must be met, because otherwise demagnetization would result during operation of the electric machine 1.

Figure 7:
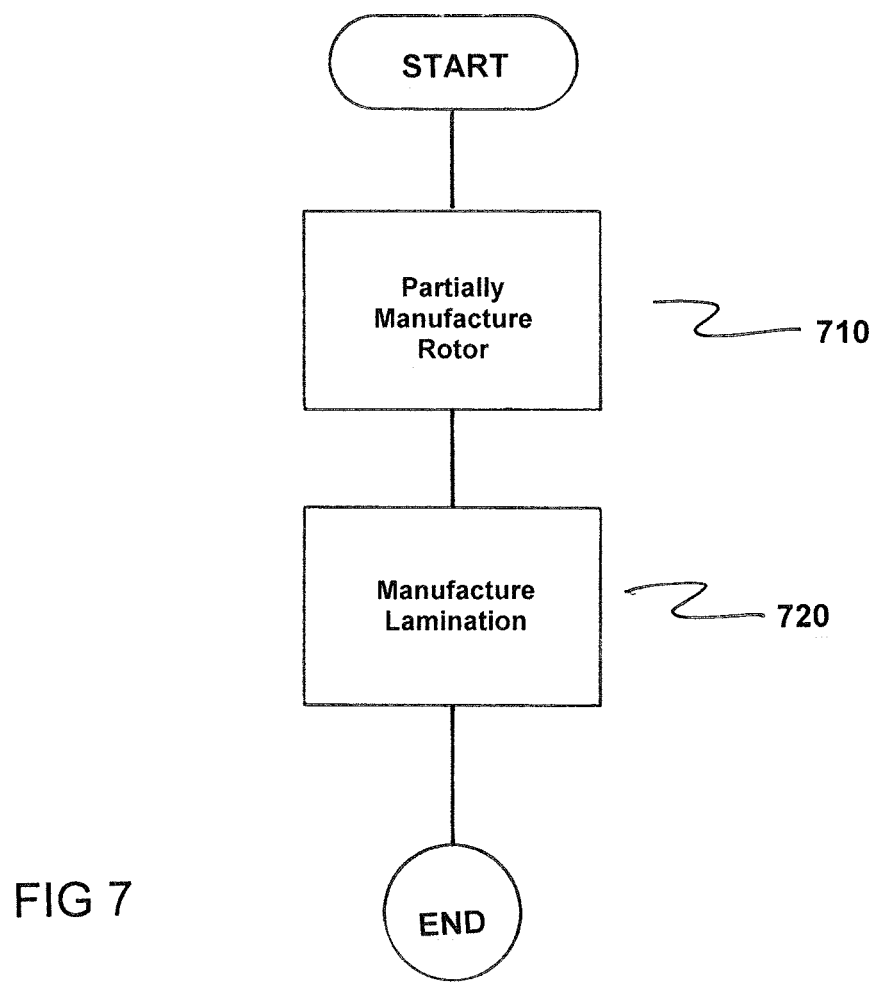
FIG. 7 is a flowchart of the method in accordance with the invention.

FIG. 7 is a flowchart of a method for producing a bell-shaped rotor 7 of an electric machine 1. The method comprises at least partially manufacturing the bell-shaped rotor 7 via an additive manufacturing method, as indicated in step 710. Next, a lamination 48 is manufactured by alternately solidifying different materials, as indicated in step 720.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A rotor of an electric machine, rotor comprising:
   a cylindrical section having magnetically active areas and non-magnetic areas; and
   an additively manufactured conical section having a web structure arranged entirely within a periphery of the additively manufactured conical section.

2. The rotor as claimed in claim 1, wherein the rotor includes radial holes.

3. The bell-shaped rotor as claimed in claim 2, wherein a non-magnetic area forms an air vane.

4. The rotor as claimed in claim 1, wherein a non-magnetic area forms an air vane.

5. The rotor as claimed in claim 1, wherein the magnetically active area has a lamination.

6. The rotor as claimed in claim 1, wherein the rotor is bell-shaped.

7. An electric machine comprising:
   an external stator;
   an internal stator arranged concentric to the external stator and within the external stator; and
   a rotor comprising a cylindrical section having magnetically active areas and non-magnetic areas and an additively manufactured conical section having a web structure arranged entirely within a periphery of the additively manufactured conical section, the rotor being arranged concentric to the external stator and the internal stator between the external stator and the internal stator and which is moveable relative to the external stator and the internal stator;
   wherein the external stator includes a plurality of windings, the internal stator includes a plurality of permanent magnets; and
   wherein the rotor comprises a carrier element formed from a non-magnetic material and which has a plurality of cutouts into which a soft-magnetic segment is arranged in each case.

8. The electric machine as claimed in claim 7, further comprising:
   a first cooling device for cooling the internal stator.

9. The electric machine as claimed in claim 8, further comprising:
   a second cooling device for cooling the external stator.

10. The electric machine as claimed in claim 9, wherein at least one of (i) the first cooling device and (ii) the second cooling device includes a plurality of cooling tubes through which cooling fluid passes.

11. The electric machine as claimed in claim 10, wherein the cooling tubes are arranged in an iron core of at least one of (i) the internal stator and (ii) the external stator.

12. The electric machine as claimed in claim 11, wherein the cooling tubes are arranged distributed uniformly in a peripheral direction along an axial direction of the electric machine.

13. The electric machine as claimed in claim 10, wherein the cooling tubes are arranged distributed uniformly in a peripheral direction along an axial direction of the electric machine.

14. The electric machine as claimed in claim 7, wherein the plurality of permanent magnets of the internal stator are formed from a ferrite.

15. The electric machine as claimed in claim 7, wherein the plurality of permanent magnets of the internal stator contain neodymium iron boron.

16. The electric machine as claimed in claim 7, wherein the rotor is connected to a hollow shaft.

17. The electric machine as claimed in claim 7, wherein the rotor is bell-shaped.

18. A method for producing a bell-shaped rotor of an electric machine, the method comprising:
   manufacturing the bell-shaped rotor at least partially via an additive manufacturing method; and
   manufacturing a lamination by alternately solidifying different materials.

19. The method as claimed in claim 18, further comprising:
   manufacturing the bell-shaped rotor to include a cylindrical section having magnetically active areas and non-magnetic areas and a conical section having a web structure.

20. The method as claimed in claim 18, wherein the rotor is bell-shaped.

* * * * *